Inventors
Harry R. Foster
& Elmo E. Crump.
BY A. D. T. Libby
Attorney.

Patented May 4, 1954

2,677,799

UNITED STATES PATENT OFFICE 2,677,799

NONLINEAR CONDENSER SYSTEM

Harry R. Foster, Lake Valhalla, and Elmo E. Crump, West Caldwell, N. J., assignors to Ohmega Laboratories, Pine Brook, N. J., a partnership composed of Harry R. Foster and Elmo E. Crump Application July 12, 1951, Serial No. 236,346

1 Claim. (Cl. 320—1)

This invention relates to the construction of a condenser of low capacity which is especially adapted for use in various types of circuits used in frequency modulated oscillators, variable frequency filters, tuning control for television sets and other applications where manually operable condensers are used. In our search for such a condenser we have discovered that when certain high dielectric material is used in the construction of condensers and when a direct current voltage is applied across such a condenser, its capacity changes hence such a structure is termed a non-linear condenser.

In practically all types of electrical equipment it is necessary to tune circuits by varying either the inductance of the coil or the capacity of an associated condenser. Such variable condensers are usually made having one set of metallic plates in fixed position known as the stator and a set of movable plates known as the rotor. These condensers have to be made accurately and are more or less expensive, depending on their size and capacity. Since they are adjustable by mechanical means, they can not be adjusted rapidly as compared with a device that can be controlled electrically. Hence, certain of the objects of our invention is to get a small condenser wherein the speed of changing its capacity may be easily and quickly accomplished. Another object of our invention is to obtain a condenser having a capacity less than 100 micro-micro-farads and whose value may be changed by the application of 500 volts or less, and this change accomplished within practically an instantaneous manner for example as one-thousandth of a second which is impossible, with manual adjustable use in tuning condensers. A further object of our invention is to obtain a condenser of this low capacity wherein the wear on the parts of the condenser is materially reduced over the usual type of tuning condenser. A further object is to provide this low capacity condenser which is very easy to mount and since there are no moving mechanical parts, the only connections to the condenser is the lead wires which may be run to the desired point in the circuit. Hence the wiring problem is substantially eliminated. A further advantage of our construction is that since the parts are very small they are not subject to mechanical vibrations such as are encountered with the usual mechanical tuning condensers. Other and further advantages will be seen from a description which follows taken in connection with the annexed drawing wherein, Figure 1 is a side elevation of our new condenser on a scale approximately four times its working size;

Figures 1, 2, 3, 4, 5, 6, 7, 8:
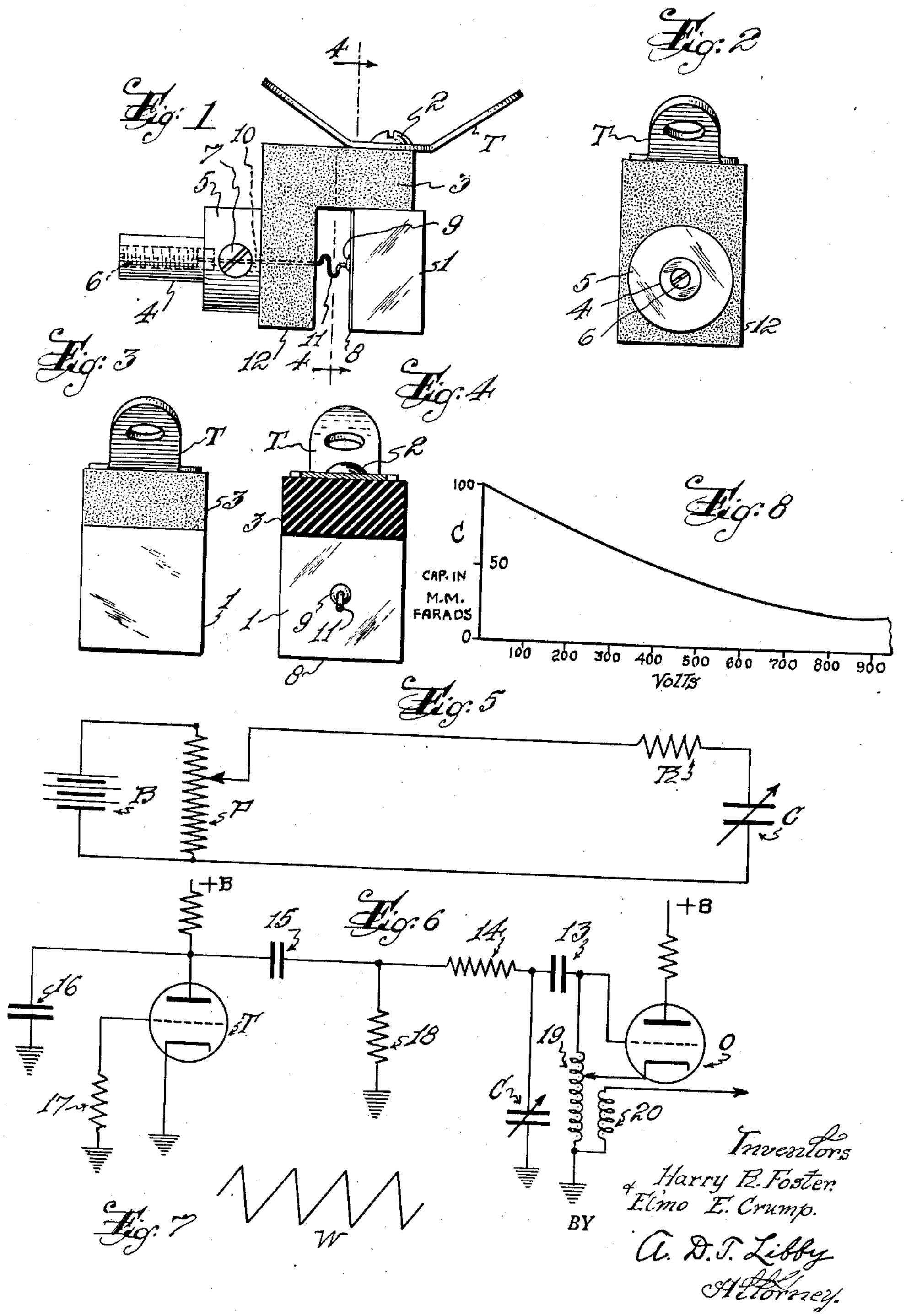
Figure 2 is a view of Figure 1 looking from left to right.
Figure 3 is a view of Figure 1 looking from right to left.
Figure 4 is a view on the line 4—4 of Figure 1.
Figure 5 is a diagrammatic illustration showing a simple type of circuit wherein a non-linear condenser is utilized.
Figure 6 shows another type of circuit in which our condenser may be utilized to great advantage.
Figure 7 is a diagrammatical view of the wave form utilized in Figure 6.
Figure 8 is a diagram showing the variation capacity with a change in voltage of our new type of condenser.

The condenser as illustrated on an enlarged scale in Figures 1–4 has a block 1 of suitable metal to which is fastened by a screw 2 an insulator 3 of suitable material such as Bakelite. Screw 2 also holds a terminal T to the insulator 3. The insulator 3 carries a stud 4 having a collar 5. The stud 4 is hollow and has an adjusting screw 6 therein which is locked in position by said screw 7. On the inner face of the block 1 is mounted in any satisfactory manner a piece of very high dielectric material 8 of suitable thickness preferably not in excess of .050. The side of the dielectric 8 next to the block 1 is covered with a metallic coating preferably of silver so that this side may be soldered to the block or base plate 1. To what might be termed a free side of the dielectric, a small silver dot 9 is applied to the dielectric as by painting the same thereon. The diameter of the dot should be about .025 inch and in view of this small size it is very difficult to solder any connection to it so a mechanical connection had to be made thereto. Attached to the screw 6 is a small wire contact having arcuate convolutions 11 located between the arm 12 of the insulator 3 and the dot 9. This method of making an electrical contact with the electrode 9 is with what we term a cat's whisker, the wire being of a material such as spring wire of beryllium copper which will hold its shape and make a good contact with the electrode 9, this contact being adjusted by a screw 6 and a lock screw 7.

With this construction we are able to obtain a capacity of less than 100 micro-micro-farads.

Coming now to the application of this condenser to a circuit:

Figure 5 shows the condenser C in a circuit including a resistance R, a potentiometer P and a battery B, by merely varying the potentiometer P, the capacity of the condenser C is changed. It is very readily seen that the potentiometer and battery may be a considerable distance away from the structure carrying the condenser and many applications of this remote control may be utilized. In Figure 6 we have shown another application of our condenser C in a sweeping or frequency modulated oscillator whose frequency is to be varied for illustration from 60 to 80 megacycles in one-thousandth of a second. To do this mechanically is impossible but we can do it by utilizing a thyratron circuit in which the tube T is of a thyratron type to give a saw tooth wave form W as illustrated in Figure 7, the voltage of which may be in the order of 200 volts. Tube O is of a sweeping oscillator type the grid of which is connected through an isolating condenser 13, an isolating resistor 14 through a condenser 15 to the plate of the tube T to which is also connected a condenser 16. The grid of tube T is connected to ground through a resistance 17. A resistance 18 is connected between the resistor 14 and the condenser 15 and to ground. The grid of the oscillator O is connected to ground through an induction coil 19 while the coil 20 associated with 19 is connected to the output circuit of the tube O.

It does not seem necessary to discuss in detail the operation of this circuit, the essential thing being that the condenser C which controls the action of the oscillator circuit is tuned automatically by the saw tooth wave W generated by the tube T at the rate of 1000 cycles per second, the change in capacity being indicated by the change of voltage as shown in Figure 8. As the condenser C changes its capacity with the voltage, the frequency of the tuned circuit changes from 60 to 80, or the reverse megacycles.

It is to be understood that the two circuits shown in Figures 5 and 6 are merely illustrative of what this non-linear condenser is capable of doing and it is useful over a large range of miscellaneous types of circuits, so that we are not limited to any particular type wherein the condenser may be found useful.

Having thus described our invention, what we claim is:

A non-linear condenser structure having a normal capacity of less than 100 M. M. F., comprising a dielectric having a thickness not in excess of .050" and also having a high constant with a surface of suitable metal such as silver on one side forming one electrode, a dot of silver approximately .025" in diameter on the opposite side of the dielectric and means for making electrical contact with said dot, said means comprising a wire of beryllium copper having a double loop convolution, said structure being capable of remote adjustment practically instantaneously by a suitable voltage not in excess of 500 and having a saw-tooth wave form of the order of approximately 1000 cycles per second.

References Cited in the file of this patent

UNITED STATES PATENTS

| Number | Name | Date |
|---|---|---|
| 2,102,383 | Sanford | Dec. 14, 1937 |
| 2,432,116 | McLean | Dec. 9, 1947 |
| 2,526,207 | Donley | Oct. 17, 1950 |

FOREIGN PATENTS

| Number | Country | Date |
|---|---|---|
| 629,215 | Great Britain | Sept. 14, 1949 |